(12) United States Patent
Bergstrom et al.

(10) Patent No.: US 12,088,910 B2
(45) Date of Patent: Sep. 10, 2024

(54) INSPECTION WORKFLOW USING OBJECT RECOGNITION AND OTHER TECHNIQUES

(71) Applicant: Fluke Corporation, Everett, WA (US)

(72) Inventors: Peter A. Bergstrom, Everett, WA (US); Brian Knight, Everett, WA (US); Jamie Rhead, Everett, WA (US)

(73) Assignee: Fluke Corporation, Everett, WA (US)

( * ) Notice: Subject to any disclaimer, the term of this patent is extended or adjusted under 35 U.S.C. 154(b) by 185 days.

(21) Appl. No.: 17/348,755

(22) Filed: Jun. 15, 2021

(65) Prior Publication Data

US 2021/0344833 A1  Nov. 4, 2021

Related U.S. Application Data (63) Continuation of application No. 16/180,873, filed on Nov. 5, 2018, now abandoned.

(Continued)

(51) Int. Cl.
| | |
|---|---|
| *H04N 23/60* | (2023.01) |
| *G06F 3/0482* | (2013.01) |
| *G06Q 10/20* | (2023.01) |
| *G06V 20/20* | (2022.01) |
| *H04N 7/18* | (2006.01) |

(52) U.S. Cl.
CPC ............. *H04N 23/64* (2023.01); *G06Q 10/20* (2013.01); *G06V 20/20* (2022.01); *H04N 7/183* (2013.01); *G06F 3/0482* (2013.01)

(58) Field of Classification Search
None
See application file for complete search history.

(56) References Cited

U.S. PATENT DOCUMENTS

| | | |
|---|---|---|
| 5,386,117 A | 1/1995 | Piety et al. |
| 5,637,871 A | 6/1997 | Piety et al. |
| (Continued) | | |

FOREIGN PATENT DOCUMENTS

| | | |
|---|---|---|
| CN | 1901629 A | 1/2007 |
| EP | 1 028 313 A2 | 8/2000 |
| (Continued) | | |

OTHER PUBLICATIONS

Fluke IR FlexCam Thermal Imagers User's Manual, Fluke Corporation, Jan. 2007, Rev. 2, 5/09, pp. 4-9 to 4-12.

(Continued)

*Primary Examiner* — Clifford Hilaire
(74) *Attorney, Agent, or Firm* — Seed IP Law Group LLP (57) ABSTRACT

Systems for guiding a user through a workflow routine can include an inspection tool, a user interface, memory, and a processor. The processor can provide instructions via the user interface to perform a workflow routine using the inspection tool and save acquiring inspection data to memory. Instructions can direct a user to which equipment to inspect and/or how to collect inspection data associated with one or more pieces of equipment. Systems can determine which equipment is available for inspection by the user, such as via image recognition or proximity detection, and instruct a user to acquire inspection data associated with such equipment. Workflow routine instructions can be provided to the user via various devices, such as an inspection tool, smartphone, or a tablet.

13 Claims, 7 Drawing Sheets

Related U.S. Application Data (60) Provisional application No. 62/582,137, filed on Nov. 6, 2017.

(56) References Cited

U.S. PATENT DOCUMENTS

| | | | |
|---|---|---|---|
| 5,724,242 A | 3/1998 | Moore-McKee et al. | |
| 5,860,066 A | 1/1999 | Rouse | |
| 5,949,418 A | 9/1999 | Shields et al. | |
| 6,542,824 B1 | 4/2003 | Berstis | |
| 6,849,849 B1 | 2/2005 | Warner et al. | |
| 7,332,716 B2 | 2/2008 | Hamrelius et al. | |
| 7,454,050 B2 | 11/2008 | Garvey | |
| 7,528,372 B2 | 5/2009 | Garvey, III et al. | |
| 7,535,002 B2 | 5/2009 | Johnson et al. | |
| 7,538,326 B2 | 5/2009 | Johnson et al. | |
| 7,732,768 B1 | 6/2010 | Haigh et al. | |
| 8,212,211 B2 | 7/2012 | Drews et al. | |
| 8,645,854 B2* | 2/2014 | Kopycinski | G06Q 10/10 |
| | | | 709/224 |
| 9,568,368 B2 | 2/2017 | Bohn et al. | |
| 10,375,325 B2 | 8/2019 | Schmidt | |
| 11,099,075 B2 | 8/2021 | Stuart | |
| 2004/0023612 A1 | 2/2004 | Kriesel | |
| 2004/0143602 A1 | 7/2004 | Ruiz et al. | |
| 2004/0160340 A1 | 8/2004 | Thomson et al. | |
| 2004/0245467 A1 | 12/2004 | Lannestedt | |
| 2005/0164684 A1* | 7/2005 | Chen | G06F 1/163 |
| | | | 455/414.1 |
| 2007/0101179 A1 | 5/2007 | Chafle et al. | |
| 2007/0174152 A1 | 7/2007 | Bjornberg et al. | |
| 2008/0099678 A1 | 5/2008 | Johnson et al. | |
| 2008/0183049 A1 | 7/2008 | Karkanias et al. | |
| 2009/0086032 A1 | 4/2009 | Li | |
| 2009/0106684 A1 | 4/2009 | Chakra et al. | |
| 2009/0177764 A1* | 7/2009 | Blatherwick | H04W 4/029 |
| | | | 709/221 |
| 2009/0184244 A1 | 7/2009 | Drews et al. | |
| 2010/0205553 A1 | 8/2010 | Haigh et al. | |
| 2010/0309315 A1 | 12/2010 | Hogasten et al. | |
| 2011/0311026 A1 | 12/2011 | Lalena | |
| 2012/0001768 A1 | 1/2012 | Radosavljevic et al. | |
| 2012/0039537 A1 | 2/2012 | Keys | |
| 2012/0242809 A1 | 9/2012 | White et al. | |
| 2013/0083187 A1 | 4/2013 | Xie et al. | |
| 2013/0090946 A1 | 4/2013 | Foo et al. | |
| 2013/0155248 A1 | 6/2013 | Neeley et al. | |
| 2013/0155249 A1 | 6/2013 | Neeley et al. | |
| 2013/0162835 A1 | 6/2013 | Forland et al. | |
| 2013/0176202 A1 | 7/2013 | Gervautz | |
| 2013/0307992 A1 | 11/2013 | Erlandsson et al. | |
| 2013/0335550 A1 | 12/2013 | Rochenski et al. | |
| 2014/0013201 A1 | 1/2014 | Erlandsson et al. | |
| 2014/0164603 A1* | 6/2014 | Castel | H04L 43/0876 |
| | | | 709/224 |
| 2014/0266765 A1 | 9/2014 | Neeley et al. | |
| 2014/0282257 A1 | 9/2014 | Nixon et al. | |
| 2014/0312112 A1 | 10/2014 | Floyd et al. | |
| 2016/0076937 A1 | 3/2016 | Stuart et al. | |
| 2016/0080666 A1 | 3/2016 | Stuart et al. | |
| 2016/0292826 A1 | 10/2016 | Beall | |
| 2016/0295134 A1 | 10/2016 | Beall et al. | |
| 2016/0295208 A1 | 10/2016 | Beall | |
| 2017/0301154 A1 | 10/2017 | Rozint | |
| 2017/0308869 A1 | 10/2017 | Reidinger et al. | |
| 2017/0374296 A1 | 12/2017 | Schmidt | |
| 2019/0005465 A1* | 1/2019 | Taylor | H04W 4/02 |

FOREIGN PATENT DOCUMENTS

| | | |
|---|---|---|
| EP | 2 495 674 A1 | 9/2012 |
| EP | 2 608 528 A1 | 6/2013 |
| WO | 94/29701 A1 | 12/1994 |
| WO | 2009/008778 A1 | 1/2009 |
| WO | 2012/116112 A1 | 8/2012 |

OTHER PUBLICATIONS

FLIR Exx Series User's Manual, FLIR Systems, Inc., Nov. 7, 2011, pp. 56-61.
Extech EX845 User's Guide, Extech Instruments Corporation (a FLIR company), 2012, p. 10.
Extech MO297 User's Guide, FLIR Systems, Inc., 2013, p. 8.
European Patent Application No. 18204629.2, Extended European Search Report mailed Dec. 11, 2018, 8 pages.

* cited by examiner

| Available Equipment | |
|---|---|
| ○ Equipment A | △ |
| ○ | |
| ○ | |

| Available Equipment | |
|---|---|
| ○ Equipment A | △ |
| ○ Equipment B | □ |
| ○ Equipment C | ⬡ |

| Available Equipment | |
|---|---|
| ○ Equipment C | ⬡ |
| ○ Equipment D | ○ |
| ○ Equipment E | □ |

FIG. 8

INSPECTION WORKFLOW USING OBJECT RECOGNITION AND OTHER TECHNIQUES

CROSS-REFERENCES

This application is a continuation of U.S. patent application Ser. No. 16/180,873, filed Nov. 5, 2018, which claims priority to U.S. Provisional Application No. 62/582,137, filed Nov. 6, 2017, each of which is incorporated by reference herein in its entirety.

BACKGROUND

Various inspection procedures can be performed using a variety of inspection tools in order to and monitor equipment for proper operation or to detect abnormal operating conditions. However, certain environments may include several pieces of equipment for inspection, and one or more such pieces of equipment can have several inspection processes associated therewith, which can contribute to complex and/or lengthy inspection processes. This can result in errors in an inspection process, such as missed data and/or undesirably long inspection times, which can result in excessive downtime or otherwise interfere with typical equipment operation. Such difficulties can be exaggerated when an operator is inexperienced and/or unfamiliar with the environment in which the inspection takes place.

SUMMARY

Aspects of this disclosure are directed toward systems and methods for collecting data during a workflow routine. Various methods can include receiving information regarding an environment and outputting information regarding pieces of equipment in the environment, such as the pieces of equipment within the environment available for inspection, directions to a location of a selected piece of equipment, one or more parameters associated with a selected piece of equipment, a workflow routine for acquiring inspection data, and/or a reference image representing a selected piece of equipment. Methods can include acquiring inspection data representative of at least one parameter associated with the identified piece of equipment. Inspection data can include image data, such as acoustic image data, infrared image data, and/or visible light image data, for example.

Exemplary systems can include an inspection tool, a user interface, memory, and a processor. The processor can be configured to provide instructions to a user to perform a workflow routine using the inspection tool to collect inspection data via the inspection tool, acquire the inspection data, and save the acquired inspection data to memory. Providing instructions can include displaying a list of equipment that is part of the workflow routine and available for inspection. Additionally or alternatively, providing instructions can include displaying a list of steps to perform during the workflow routine.

DETAILED DESCRIPTION

Workers who perform inspections and/or maintenance routines for various types of equipment (e.g., pumps, motors, transformers, electrical panels, etc.) typically carry measuring devices from location to location, take measurements of various pieces of equipment in specified ways, and often do so repeatedly. Such measuring devices can include one or more imaging tools capable of generating image data representative of a target scene and/or one or more test and measurement tool capable of generating measurement data representative of one or more parameters of an object under test.

Exemplary imaging tools can include electromagnetic imaging tools, and can be configured to generate image data representative of electromagnetic radiation from a target scene, such as infrared image data, visible light image data, ultraviolet image data, millimeter wave image data, and the like. Combinations of one or more electromagnetic spectrums may also be used, for example, as described in U.S. Pat. No. 7,538,326, entitled "VISIBLE LIGHT AND IR COMBINED IMAGE CAMERA WITH A LASER POINTER," which is assigned to the assignee of the instant application, and is hereby incorporated by reference in its entirety.

Additionally or alternatively, an imaging tool can include an acoustic imaging tool including one or more acoustic sensor elements used to generate an acoustic image of a target scene. Exemplary acoustic imaging tools, and combinations of acoustic imaging tool and electromagnetic imaging tools, are described in U.S. patent application Ser. No. 15/802,153, filed Nov. 2, 2017, and entitled "FOCUS AND/OR PARALLAX ADJUSTMENT IN ACOUSTIC IMAGING USING DISTANCE INFORMATION," which is assigned to the assignee of the instant application and is hereby incorporated by reference in its entirety.

Electromagnetic imaging tools and/or acoustic imaging tools may be combined or otherwise in communication with one another and/or with other test and measurement tools, for example, as described in U.S. patent application Ser. No. 14/855,884, filed Sep. 16, 2015, and entitled "TEST AND MEASUREMENT SYSTEM WITH REMOVABLE IMAGING TOOL," which is assigned to the assignee of the instant application and is hereby incorporated by reference in its entirety. In some examples, imaging and/or test and measurement functionally may be incorporated into a user's external device (e.g., smartphone, tablet, etc.), such as described in U.S. patent application Ser. No. 14/855,864, filed Sep. 17, 2015, and entitled "MOBILE DEVICE USED WITH ISOLATED TEST AND MEASUREMENT INPUT BLOCK," which is assigned to the assignee of the instant application and is hereby incorporated by reference in its entirety.

Maintenance activities may also be performed and recorded for future reference and analysis. Inspection and/or maintenance data may be analyzed individually or collectively and used for predictive maintenance or fault prediction.

In some cases, maintenance and/or inspection processes can be complex and/or lengthy, making consistent inspections difficult to perform consistently while gathering a complete set of proper data. Additionally or alternatively, such processes may be performed by an inexperienced worker and/or a worker that is unfamiliar with one or more inspection processes and/or a particular environment in which the maintenance and/or inspection process is being performed.

Aiding techniques and data processing techniques can be used to guide and assist an individual in performing a maintenance and/or inspection process, for example, by assisting a system user in a data collection workflow process. Such aiding can result in faster, easier, and more reliable/consistent data collection. In various examples, these aiding techniques can support or provide an inspection and/or maintenance workflow procedure. For example, in some embodiments, such techniques provide guidance to the user during the workflow and may involve manual inputs from the user and/or automatic means of acquiring and analyzing measurements.

In various examples, useful information for performing various tasks in a maintenance and/or inspection procedure may be provided to the user on an ongoing basis throughout the process, and can be provided on-demand or automatically by a processing/analysis system. Such information may include the locations of equipment that is to be inspected, how the measurements should be taken, and whether or not measurements that are obtained are taken appropriately. This information may be provided to the user in the form of text messages, as graphical/text indicators superimposed on live imagery, as sound cues, as light indicators, or by other means. In various embodiments, determining which indicators should be presented to a user can be performed in a variety of ways, including, for example, location detection, processing live imagery to determine the identify of an object under test, or other live data (e.g., proximity detection relative to an object) collected from other sensor devices.

As or after maintenance and/or inspection(s) are performed, various data can be recorded, such as, for example, a record of the inspection/maintenance activities performed, entries made by the user, aiding data that is provided to the user during inspections, inspection results (measurements), or combinations thereof. One or more such recorded data elements may be made available to a computerized maintenance management system (CMMS), including a computer database of one or more maintenance operations. Such database entries can include a variety of maintenance and/or inspection information, including past results, instructions for performing such processes, possible errors that can be observed during maintenance/inspection, and the like. The aiding and processing techniques and results described herein therefore provide useful data which improves the effectiveness of such a maintenance management system. Such additional data, along with the increased reliability of measurements due to aiding, result in better maintenance of equipment and more reliable fault predictions.

Inspection and/or maintenance tools and/or activities may be part of an overall CMMS system. For example, in some embodiments, one or more tools (e.g., a test and measurement tool, imaging tool, etc.) carried by a user can be configured to provide inputs from the inspection and/or maintenance activities to the CMMS system. Additionally or alternatively, such data may be entered to a CMMS system by a software platform that is accessed by a separate device, such as a computer workstation, an external device such as a smartphone or a tablet, or the like. For instance, in some examples, data acquired by a tool carried by a user (e.g., an imaging tool, a test and measurement tool, or the like) can be communicated to an external device such as described in U.S. patent application Ser. No. 14/855,989, filed Sep. 17, 2015, and entitled "DISPLAY OF IMAGES FROM AN IMAGING TOOL EMBEDDED OR ATTACHED TO A TEST AND MEASUREMENT TOOL," which is assigned to the assignee of the instant application and is hereby incorporated by reference in its entirety.

In some examples, such a software platform may involve a licensing and delivery model in which software is licensed on a subscription basis and is centrally hosted and may be referred to as a Software as a Service, or SAAS. Such a system may be made accessible to users using a client via a web browser or other means.

Measurement data, including imagery, over time, for example, for a particular piece of equipment, as well as analysis results of such data and/or signals sent directly from the equipment itself, may be provided to and made available from the SAAS. Such data can include results from a variety of sensor devices including images from an IR, VL, acoustic, or other imaging system. Data can additionally or alternatively include metrics/analysis/trends obtained by analysis from such measurements and imagery. In various examples, data from the SAAS, such as imagery, measurement data, and other data for a piece of multiple pieces of equipment may be automatically associated to that equipment and may be provided to a user of the SAAS, for example, to assist with future maintenance and/or inspection processes.

Such imagery, measurement data, and other data, such as analysis results and trend data, may be provided to a user in an on-demand fashion, or automatically via an alarm/notification system. For example, such data may be downloaded from the SAAS and stored in memory on board one or more tools carried by a user, and/or on a user's personal device, such as a smartphone or tablet. Additionally or alternatively, a user may access such data real time from a remote location, such as a hosted server providing access to a user, e.g., via a tool and/or a personal device. Thus, a user may receive data (e.g., using a tool and/or personal device) that can provide information representative of previous and/or expected measurement information, steps for performing one or more maintenance and/or inspection processes, or other equipment information.

In some embodiments, trend analysis and/or generating a CMMS or SAAS for use with guided inspections can include building a statistical database of typical equipment operation, for example, as described in U.S. patent application Ser. No. 15/190,792, filed Jun. 23, 2016, and entitled "THERMAL ANOMALY DETECTION," which is assigned to the assignee of the instant application and is hereby incorporated by reference in its entirety.

In addition or alternatively to equipment information, a user may be provided (e.g., via on-board memory, network access, etc.) a workflow routine instructing the user how to perform one or more maintenance and/or inspection processes. In some examples, a workflow routine may be documented in the form of a procedure, which may be brief or quite detailed. A detailed procedure may include, for example, a list of equipment to be inspected and/or maintained, the measuring devices (sensors) to use for each piece of equipment to be inspected, and/or the methods and/or settings in which the measuring devices are to be used at each inspection step.

One or more measuring devices (e.g., imaging tools, test and measurement tools, etc.) used during workflows may include an interface that allows for access/viewing of a workflow procedure, stored as an electronic document or instruction set, which the user may review at will during the inspection. The electronic document or instruction set may reside on one of, and may be shared between, the multiple sensing devices used during the workflow. The electronic document may reside on a separate device (pc, smartphone, or tablet) that the user carries during the inspection process, or it may reside remotely and be communicated to the measuring equipment or other device that the user carries, (from a data cloud or a central hub that is used for data collection and processing).

An exemplary workflow procedure may include the physical route of the inspections/maintenance, the equipment to be inspected/maintained, the measurement devices (e.g., imaging tools, test and measurement tools, etc.) to be used in inspecting each piece of equipment at each step, measurement device settings, connection diagrams for electrical and other contact inspections, required viewing angles and perspectives for image inspections, and/or previously acquired reference images that indicate the appropriate image appearance for imagery at each step of an image-based inspection. Such imagery inspections may involve IR, VL, mm wave, acoustic, or other imaging devices.

The measuring devices (imagers and other sensors) or a separate device (pc, smartphone, or tablet) that the user is carrying may have access to the electronic workflow procedure. Additionally or alternatively, the user may be able to manually record their progress and/or measurement results during the inspections and measurements during the workflow, for example, saving data to a SAAS and/or CMMS. In some examples, the progress through the workflow and/or the measurements themselves may be recorded automatically.

In some embodiments, the physical real-time location of a user and/or of the measuring device(s) may be automatically tracked during the workflow or may be manually entered by the user. Automatic methods may include GPS, inertial tracking methods, triangulation by use of external devices, by proximity or RFID sensors placed at various locations, or by other means. The physical location of equipment to inspect may also be known to the processing system. The real-time location data of the operator and sensors may be used to infer which pieces of equipment can be inspected (e.g., are near the user, such as within a predetermined proximity of the user) at a given time. These determinations can be made either inside a measuring device (e.g., imaging tools, test and measurement tools, etc.), in a separate device that the user is carrying, (ex. pc, smartphone, or tablet), or at a separate processing hub which is in communication with one or more such devices.

In some examples, guidance can be provided to a user as to the proper actions/measurements to take for a given one or more pieces of equipment that are accessible for inspection a given point. For example, based on known locations of a user and equipment available for inspection, should the user wish to take a measurement or collect an image at a known location, a set of candidate equipment for inspection at that location may be indicated to the user. Thus, the user may select an item from a candidate list of known items. Such a selection may trigger execution of further guidance for performing maintenance and/or inspection of the selected equipment, and/or may pre-load a variety of available data representative of the equipment, eliminating the need for manual entry of some such details, such as the full description of the equipment. As the user verifies the specific identity of the equipment of interest, the instructions for taking required measurements may be indicated, and any subsequent measurements may be automatically associated to the specific equipment for future reference (e.g., in a CMMS and/or SAAS).

In some applications, a specific piece of equipment near the user can be identified automatically and in real time. In various examples, such identification can be achieved as a result of the known physical location of the inspection device(s) and equipment, or by an identification signal (active or passive) transmitted from the equipment to the inspection device, or by an external triangulation system.

Additionally or alternatively, when a user is carrying an imaging tool (e.g., an imaging system), specific identification of the equipment might be achieved by object recognition image processing techniques where the equipment is identified within the imagery in real time. Such techniques can include, for example, correlation methods and blob analysis. In some embodiments, identification of a specific piece of equipment might be achieved by combing live data obtained from a number of different sensors such as acoustic, mm-wave, visual imaging, and IR imaging.

In various embodiments, if equipment of interest is identified automatically (e.g., via location determination and/or image recognition), a user may or may not be prompted to manually select the equipment, for example, from a candidate list, or otherwise confirm the identity of the automatically identified equipment. For instance, in some examples, identification of the equipment to be inspected may be indicated to the user, and useful reference information regarding the specific equipment can be provided automatically to the user. Association of the specific equipment identity to subsequently obtained imager data or other sensor data measurements may also be automatic.

In some examples, the viewing perspective (orientation, position, and measuring distance) of an imaging device, (IR, VL, mm wave, acoustic), may be automatically determined or manually entered by the user. Automatic determination might be achieved using sensors within the imager (e.g., orientation sensing via accelerometers or the like, position sensing such as GPS or the like, etc.), or by externally placed sensors, or might be determined from the imagery itself using image processing techniques such as object recognition. In some examples, a procedure step (e.g., in a workflow routine) may be indicated by the user to the system, where one or more procedure steps is associated with and therefore implies a particular viewing location and perspective for a specific piece of equipment.

In some such examples, the system (e.g., via an imaging tool) may direct a user to a location for capturing image data from such a predetermined location. Such an image capturing location may be associated with an image previously captured and associated with the procedure step. Thus, directing a user to the location can include a rephotography process in order to reproduce the capture point of the previously captured image. Exemplary such processes are described in U.S. patent application Ser. No. 13/331,633, filed Dec. 20, 2011, and entitled, "THERMAL IMAGING CAMERA FOR INFRARED REPHOTOGRAPHY," U.S. patent application Ser. No. 13/331,644, filed Dec. 20, 2011, and entitled, "THERMAL IMAGING CAMERA FOR INFRARED REPHOTOGRAPHY," and U.S. patent application Ser. No. 13/336,607, filed Dec. 23, 2011, and entitled, "THERMAL IMAGING CAMERA FOR INFRARED REPHOTOGRAPHY," each of which is assigned to the assignee of the instant application and is incorporated by reference in its entirety.

Location/perspective specific reference imagery and other data may be stored prior to performing the workflow, for each piece of equipment that is of interest for imaging or data collection. This data may be stored in the measuring device, a separate device that the user carries, or in a central processing hub. This data may be provided to the user automatically or on demand throughout the workflow for reference. In the case of imaging tasks such as infrared, visible light, or acoustic measurements, this reference imagery may be used by the user as a guide that indicates how the appropriate view should appear for the imager as measurements are acquired. The reference imagery can be displayed along with live scene imagery, and other data may be processed by the system in order to provide useful guidance and cues to the user.

Additionally or alternatively, the known real-time imaging perspective and current physical location data, along with previously acquired reference imagery/data, and other data, may be used to determine what objects or equipment are to be expected in the current imagery at a given time. For instance, in an exemplary embodiment, rather than use current location information to guide a user to reposition an imaging tool to a previous position, analysis of current location information may be used (e.g., via a processor) to determine that the tool is near a location from which previous image data (or other data) was captured. Such a location or equipment located at such a location can be presented to the user as a possible inspection candidate.

In some examples, a notification or description of such potential equipment can be presented to the user. These indications might include a display of the previously acquired reference image of the equipment. Object recognition image processing techniques such as correlation or blob analysis methods may be used to search for, indicate, and track objects in the imagery which are candidates for known pieces of equipment needing inspection. Such candidates may be presented to the user with an option to confirm the identity of a piece of equipment. In the case where a specific piece of equipment is identified automatically by the system, in various embodiments, a user may or may not be prompted to select or confirm the identity of the equipment. In some such examples, any related messaging to the user or association of the equipment identity to the image and/or other sensor data may then be performed automatically.

In some embodiments, object recognition and other image processing techniques can be used to determine automatically and in real time when pieces of equipment that are required for inspection are present in the image scene. These techniques may also be used to determine when the objects are present but are not being viewed appropriately for imaging measurements. Image processing and/or other techniques can determine errors in the imaging process, and can provide guidance to the user (e.g., to refocus, change position, change viewing perspective, etc.). In addition, a system may automatically determine whether the correct settings for obtaining imagery of the equipment are being applied or not to the imager. If not then the system may automatically provide appropriate guidance for changing these settings to the user.

In some embodiments, where a system has an awareness of the image appearance of one or more pieces of equipment to be imaged, and has an awareness of the correct settings for the imager for each measurement, the system may automatically apply the appropriate control settings to the imager as a known piece of equipment is inspected or imaged. If the imager settings and imagery itself is determined to be appropriate for a required measurement for a piece of equipment, a message may be provided to indicate this status to the user so that the user knows that it is appropriate to obtain a manual image measurement. In some applications, image data may be captured automatically for a desired piece of equipment in the event that the system determines that the imager settings and live image content are appropriate for the inspection of that equipment (e.g., if an image is sufficiently reproduced, or if relevant portions of the equipment are recognized to be within the imaged scene).

In some applications, if the combination of results from image processing and other sensor data indicates that a measurement is not being taken correctly, such as a desired object is not being viewed from the correct perspective, angle, or position, in order to acquire a measurement correctly, the system may take one or more corrective actions. For example, in some embodiments, a system may signal a user to alert the user of an error. In some examples, if an image is being incorrectly viewed, the system may provide signals a positioning device capable of physically moving an imaging tool to the appropriate viewing position and/or angle for the measurement. The measurements may then be acquired automatically by the system, or prompt the user to acquire one or more desired measurements.

Various examples of system operation are described below with reference to FIGS. 1-8.

Figure 1:
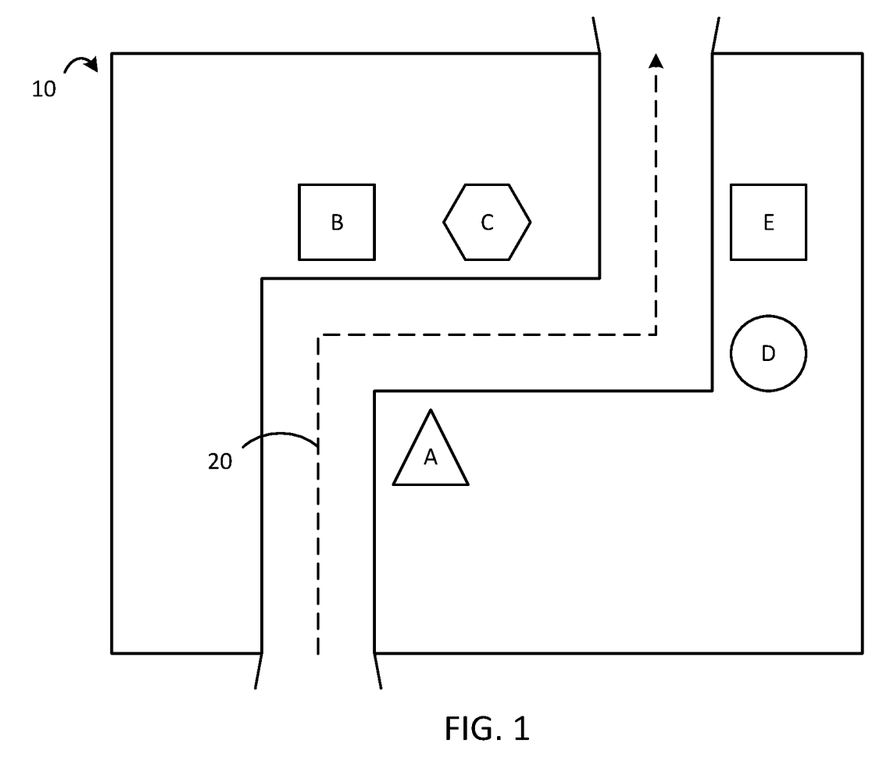
FIG. 1 shows an environment including a plurality of pieces of equipment suitable for inspection and/or maintenance.

FIG. 1 shows an environment 10 including a plurality of pieces of Equipment A, B, C, D, and E suitable for inspection and/or maintenance. A path 20 extends through the environment 10 and moves past Equipment A, B, C, D, and E. In some embodiments, a system (e.g., a measurement device, a user's mobile device, a workstation, a remote server, etc.) can include a map of environment 10, for example, showing path 20 for performing an inspection and/or maintenance routine. Such a map may be viewed by a user for determining an appropriate route for performing a given workflow. Additionally or alternatively, a textual or other description may be used to guide a workflow.

Figure 2:
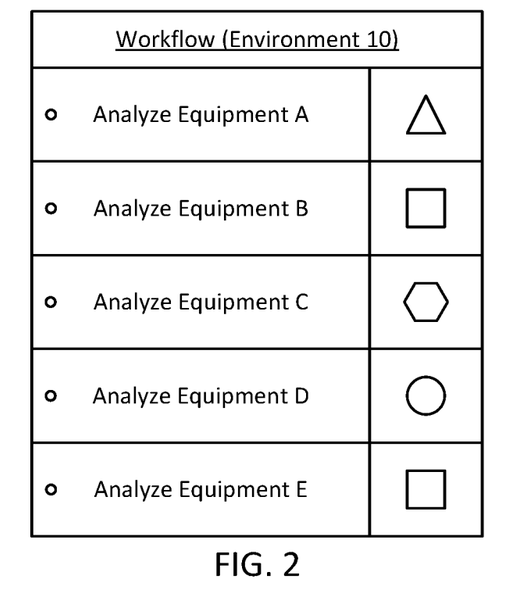
FIG. 2 shows an exemplary workflow routine for performing inspection and/or maintenance within an environment.

FIG. 2 shows an exemplary workflow routine for performing inspection and/or maintenance within environment 10. Such a workflow can include steps such as analyzing various equipment, such as Equipment A-E. In some embodiments, a graphical interface showing a workflow such as that shown in FIG. 2 can be displayed to a user as an overview of a workflow prior to performing the workflow and/or a checklist of steps to be viewed during the workflow. In some examples, a user may select a step from the graphical workflow representation to view additional information about the step, such as various analysis and/or other steps to perform. The exemplary workflow shown in FIG. 2 further includes sample images associated with each step. Such images may be stored in memory (e.g., as part of a CMMS and/or SAAS), and may be used as a visual aid for identifying equipment for inspection and/or as a template or guide for reproducing like images during inspection.

In an exemplary embodiment, a user may be presented with the workflow for environment 10 shown in FIG. 2 without access to a map such as that shown in FIG. 1. The provided workflow informs the user which equipment within the space should be analyzed (e.g., inspected). A user may enter the environment 10 to being the inspection process without explicit knowledge of the location of each of the prescribed pieces of equipment to analyze, but may be provided with images (e.g., as shown) indicating which equipment should be analyzed. Additionally or alternatively, as mentioned elsewhere herein, a user may be alerted as to which equipment may be currently available for inspection, for example, due to being within a certain proximity of such equipment.

Figure 3A:
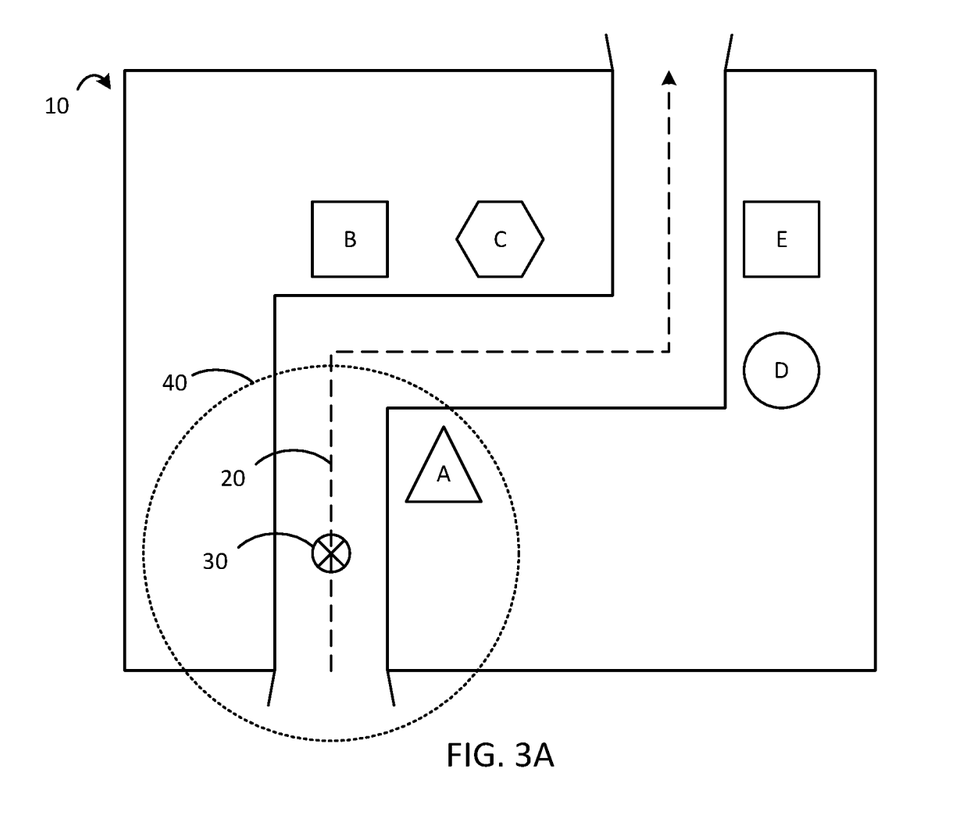
FIG. 3A shows an illustration of a user traveling along an inspection path within an environment.

FIG. 3A shows a user 30 along inspection path 20 within environment 10. In various embodiments, a user may be guided explicitly down path 20 for performing a workflow routine, such as via GPS or other real-time location monitoring technology. In other examples, path 20 may be the only practical path through environment 10. In still further examples, a user may travel through environment 10 via an arbitrary path (e.g., path 20).

In the illustrated example, equipment within a predetermined proximity 40 of the user becomes available and/or recommended for inspection. In some such embodiments, wireless communication between one or more measurement devices carried by the user (e.g., a test and measurement tool, an imaging tool, etc.) functions within proximity 40. Additionally or alternatively, in some embodiments, a tool carried by the user may determine a distance from one or more pieces of equipment, and identify the equipment within a predetermined proximity (e.g., 40), such as a programmed proximity within which a user should be able to identify the equipment for analysis. In some embodiments, such a predetermined proximity may be adjustable, for example, via a user interface or a remote server.

Figure 3B:
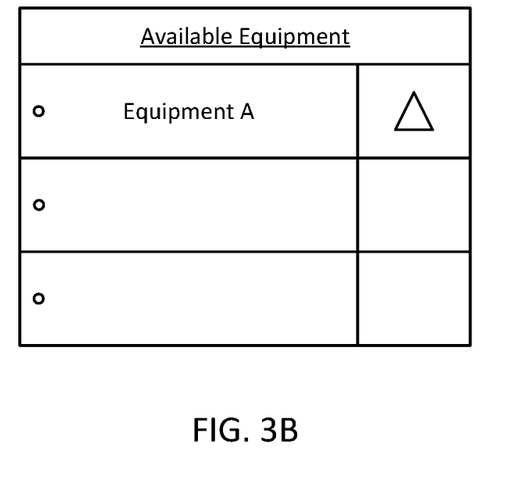
FIG. 3B shows an exemplary interface illustrating to a user that a piece of equipment is available for inspection.

In the illustrated example of FIG. 3A, Equipment A is within proximity 40 of user 30. FIG. 3B shows an exemplary interface illustrating to a user that Equipment A is available for inspection. Such an interface may be provided to the user via a tool (e.g., a test and measurement tool, an imaging tool), an external device (e.g., a smartphone, tablet, etc.) or the like. In the example of FIG. 3B, Equipment A is listed as the equipment available for inspection, since Equipment A is within the proximity 40 of user 30. In an exemplary embodiment, user 30 may select Equipment A on the interface, and receive subsequent instruction for performing maintenance and/or inspection of Equipment A. In some examples, a user may receive additional data representative of Equipment A, such as a representative image, typical operating parameters, and the like. In some embodiments, if a tool (e.g., an imaging tool, a test and measurement tool, a remote device interfacing with tool, etc.) determines that only one piece of equipment (e.g., Equipment A) is within range, that equipment may be automatically selected for inspection. For example, a reference image, an inspection process, typical operating parameters, and/or other information related to the equipment may be automatically presented.

Figure 4A:
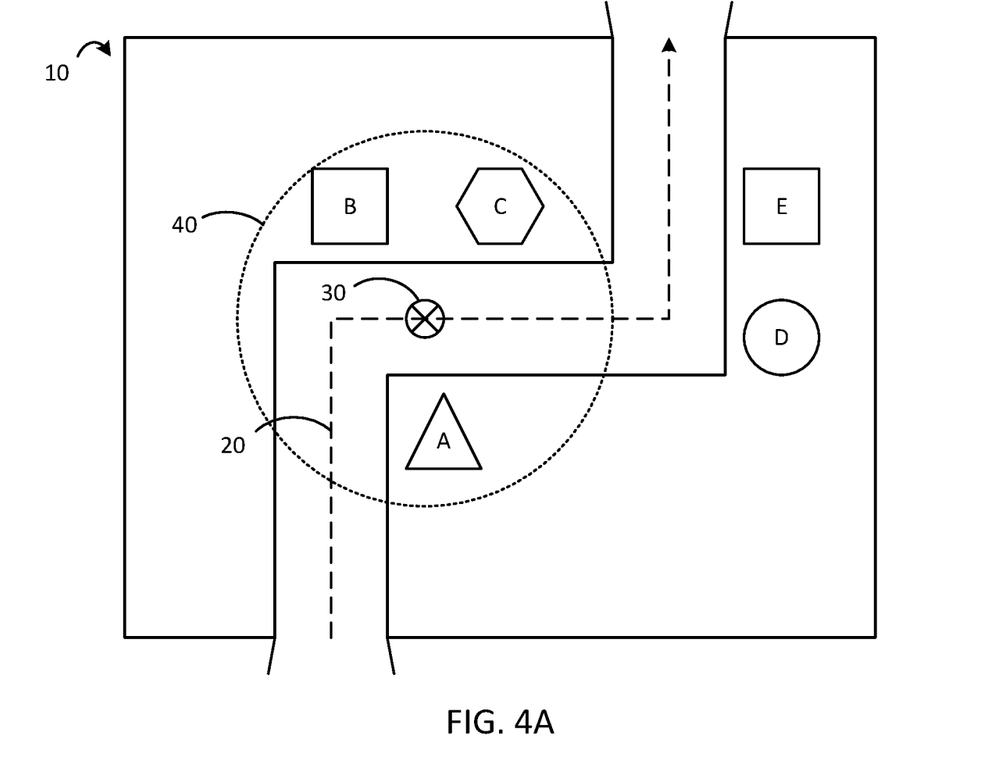
FIG. 4A shows an illustration of the user of FIG. 3A at a different location along the inspection path within the environment.
Figure 4B:
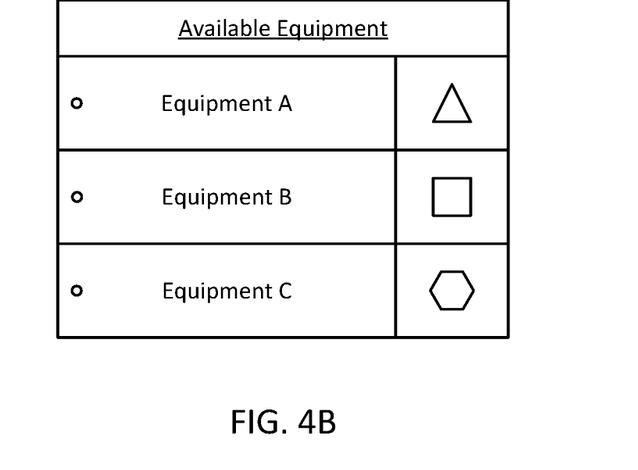
FIG. 4B shows an exemplary presentation of a list of equipment within a predetermined proximity of the user in FIG. 4A.

FIG. 4A shows user 30 at a different location along inspection path 20 within environment 10. In the illustrated example of FIG. 4A, the user 30 is within a predetermined proximity 40 of Equipment A, B, and C. As described, in some embodiments, a user 30 may be presented with a list of equipment within a predetermined proximity 40 of the user 30. FIG. 4B shows an exemplary presentation of a list of equipment within the predetermined proximity 40 of the user 30 in FIG. 4A. In some examples, the list of available equipment includes representative images of the available equipment.

As shown, Equipment A, B, and C are considered available for inspection given the location of the user 30. In an exemplary embodiment, the user may select a piece of equipment from the list of available equipment in order to receive additional information regarding the equipment and/or inspection processes related thereto.

In some embodiments, a system can determine when prescribed maintenance for a given piece of equipment has been performed (e.g., due to automatic data acquisition, receiving manual data entry, receiving an input from the user indicating inspection is complete, etc.), and can update the interface to indicate which equipment has been analyzed according to the workflow routine and which equipment has yet to be analyzed. For instance, if a user 30 inspects Equipment A when available at the location shown in FIG. 3A, when the user arrives at the location in FIG. 4A, Equipment A may be excluded from the list of available equipment for inspection or may otherwise be presented differently from equipment for which inspection data has not yet been acquired. In some examples, equipment for which inspection data has been captured will be displayed in a different color, or may be grayed out and/or not selectable by a user. In some embodiments, a user may select the equipment for which data has already been captured in order to review the captured data, or to capture new or additional data.

Figure 5A:
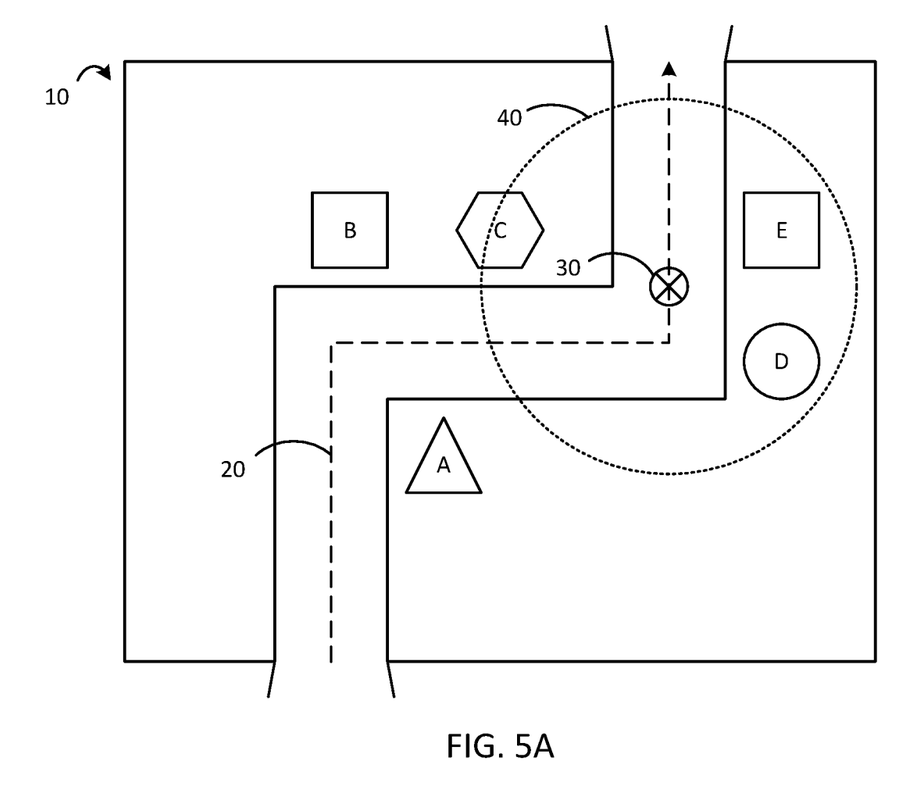
FIG. 5A shows an illustration of the user of FIGS. 3A and 4A at a different location along the inspection path within the environment.
Figure 5B:
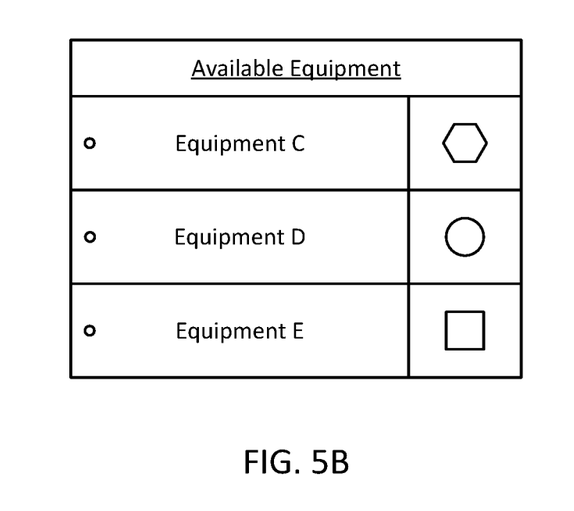
FIG. 5B shows an exemplary presentation of a list of equipment within a predetermined proximity of the user in FIG. 5A.

FIG. 5A shows user 30 at yet another different location along inspection path 20 within environment 10. In the illustrated example of FIG. 5A, the user 30 is within a predetermined proximity 40 of Equipment C, D, and E. As described, in some embodiments, a user 30 may be presented with a list of equipment within a predetermined proximity 40 of the user 30. FIG. 5B shows an exemplary presentation of a list of equipment within the predetermined proximity 40 of the user 30 in FIG. 5A. In some examples, the list of available equipment includes representative images of the available equipment.

As shown, Equipment C, D, and E are considered available for inspection given the location of the user 30. In an exemplary embodiment, the user may select a piece of equipment from the list of available equipment in order to receive additional information regarding the equipment and/or inspection processes related thereto. As described above, in some examples, equipment for which inspection data has already been acquired may be presented differently from equipment for which data has yet to be acquired. For example, if a user performed an inspection of Equipment C while at the location shown in FIG. 4A, Equipment C may be excluded from or otherwise presented differently than Equipment D and E in the list of available equipment shown in FIG. 5B.

Figure 6A:
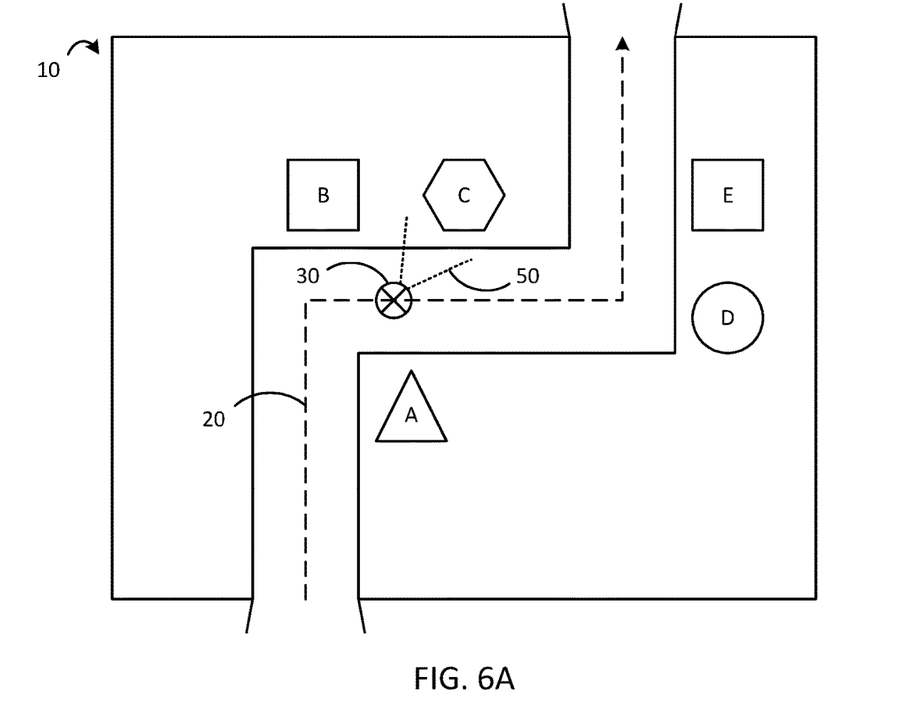
FIG. 6A shows an illustration of a user at a location along an inspection path within an environment.
Figure 6B:
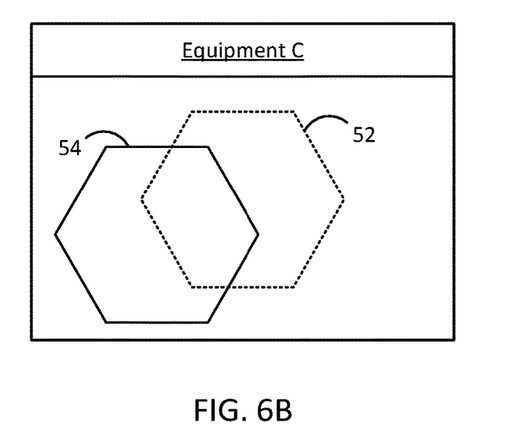
FIG. 6B shows an exemplary interface assisting a user in capturing an appropriate image of a piece of equipment.

FIG. 6A shows the user 30 at a location along path 20 in environment 10 similar to the location shown in FIG. 4A. In the illustrated example of FIG. 6A, Equipment C is in a field of view 50 of a tool (e.g., an imaging tool) carried by the user 30. As described elsewhere herein, in some examples, an inspection system (e.g., an imaging tool) can assist a user in capturing an image of equipment. FIG. 6B shows an exemplary interface assisting a user in capturing an appropriate image of Equipment C. In the illustrated example, a template image 52 (e.g., associated with the prescribed workflow routine) is displayed on an interface associated with Equipment C. A live image 54 can be presented alongside the template image (e.g., with one or both images being partially transparent) to assist a user in positioning an imaging tool to capture an image similar to the one associated with the workflow routine. In addition or alternatively to providing a template image, other instructions/guidance can be provided for recapturing a new image corresponding to the reference image, such as described in U.S. patent application Ser. Nos. 13/331,633, 13/331,644, and 13/336,607, each of which is incorporated by reference.

Figure 6C:
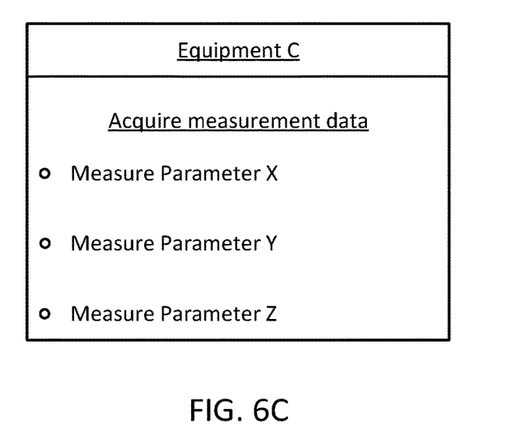
FIG. 6C shows an exemplary interface instructing a user to acquire measurement data representative of parameters associated with a piece of equipment.

In addition or alternatively to capturing image data, various other parameters may be captured during a workflow routine, for example, measurement data that can be captured via a test and measurement tool. FIG. 6C shows an exemplary interface instructing a user to acquire measurement data representative of parameters associated with Equipment C (Parameter X, Parameter Y, Parameter Z). Such parameters can include a variety of different parameters, for example, that can be analyzed/acquired using a test and measurement tool that may be carried by a user. In some embodiments, a user may select from the list of parameters in order to view instructions on how to measure such a parameter. Upon selection of a parameter, the user may be presented with detailed instructions for acquiring measurement data representative of that parameter and/or an interface on a measurement tool suitable for performing a measurement data acquisition.

In various embodiments, only image data, only measurement data, or both image data and measurement data can be required during a workflow. Thus, in various embodiments, a user may be presented with an image capture interface (e.g., as shown in FIG. 6B), a measurement data acquisition interface (e.g., as shown in FIG. 6C), or both. In some examples, an "acquire image data" or similar step may be presented in a list of steps to perform during a workflow routine. In various examples, a system may present workflow routine steps to a user individually and sequentially in order to guide the user through the workflow process. Alternatively, a user may be presented with a list of steps, from which a user may select a step in the process to perform. Upon such a selection, the system may assist the user in performing the selected step.

Figure 7:
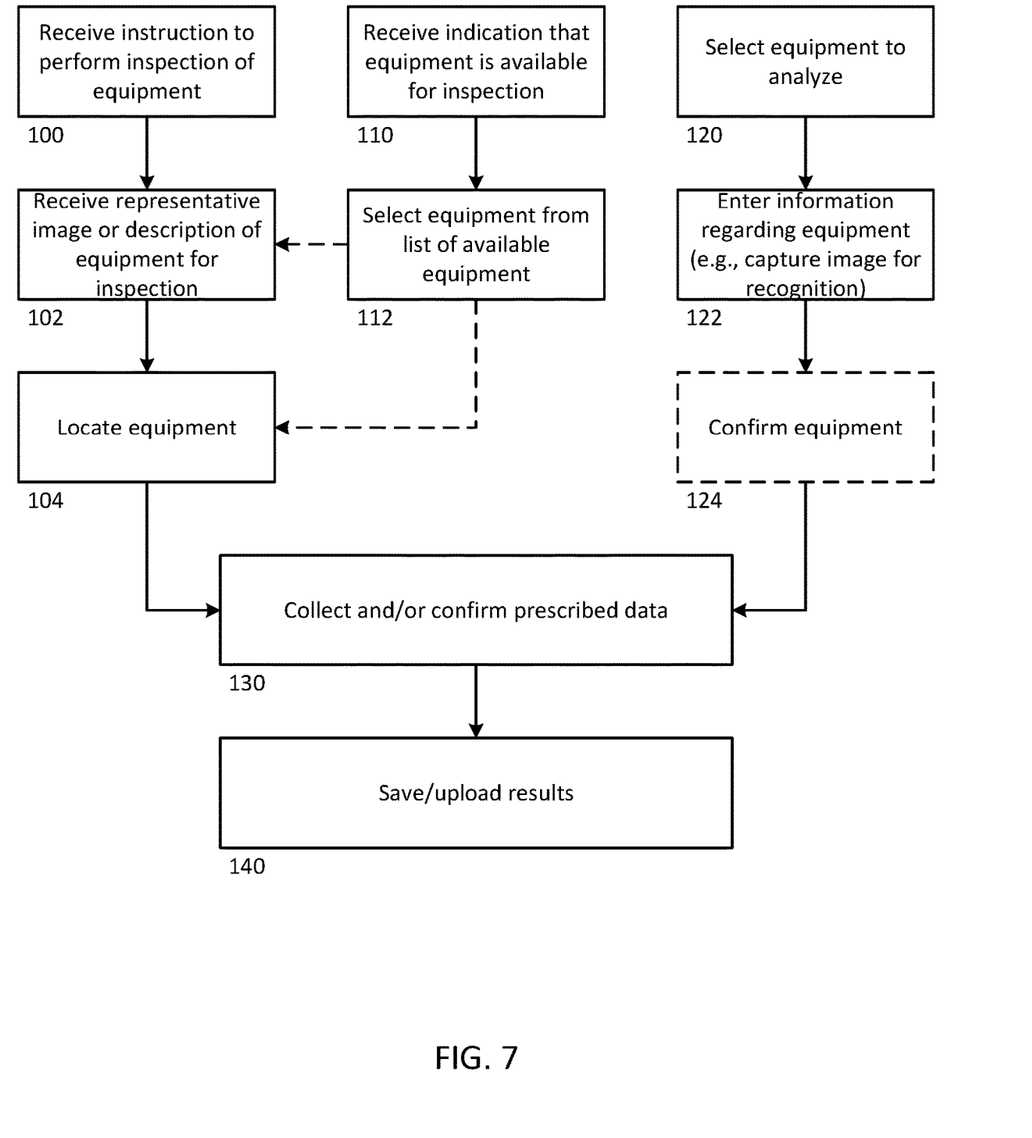
FIG. 7 is a process flow diagram illustrating a variety of possible processes for collecting data during a workflow routine and saving and/or uploading the results.

FIG. 7 is a process flow diagram illustrating a variety of possible processes for collecting data during a workflow routine (130) and saving and/or uploading the results (140). In an exemplary process, a user can receive instruction to perform an inspection process of a given piece of equipment (100), and can receive a representative image or description of the equipment to assist in the inspection (102). Upon receiving such assistance information, the user may location the equipment (104) for inspection.

In another exemplary process, the user may receive an indication that equipment is available for inspection (110), and select equipment for inspection, for example, from a list of available equipment (112). In some examples, upon selection, the user may receive a representative image or description of the selected equipment (102), or may locate the equipment (104) based on, for example, information from the provided list of available equipment.

In yet another exemplary process, the user may select equipment within an environment for analysis (120) and enter information representative of the equipment into an inspection system (e.g., via an interface in an imaging tool, a test and measurement tool, an external device, etc.). In various examples, the user can capture an image of the selected equipment, input a type or location of such equipment, or the like. An inspection system may be programmed with instructions to identify the equipment for inspection based on the information input by the user, for example, via image recognition or the like. In some examples, the system may present information regarding the equipment the system believes is to be inspected, which can be confirmed by the user (124).

After the equipment is located (104) and/or confirmed (124), the user may collect data according to a workflow routine or otherwise confirm data captured automatically is satisfactory for performing the routine (130). The results (e.g., inspection results) can then be saved locally or uploaded to a server (140).

Figure 8:
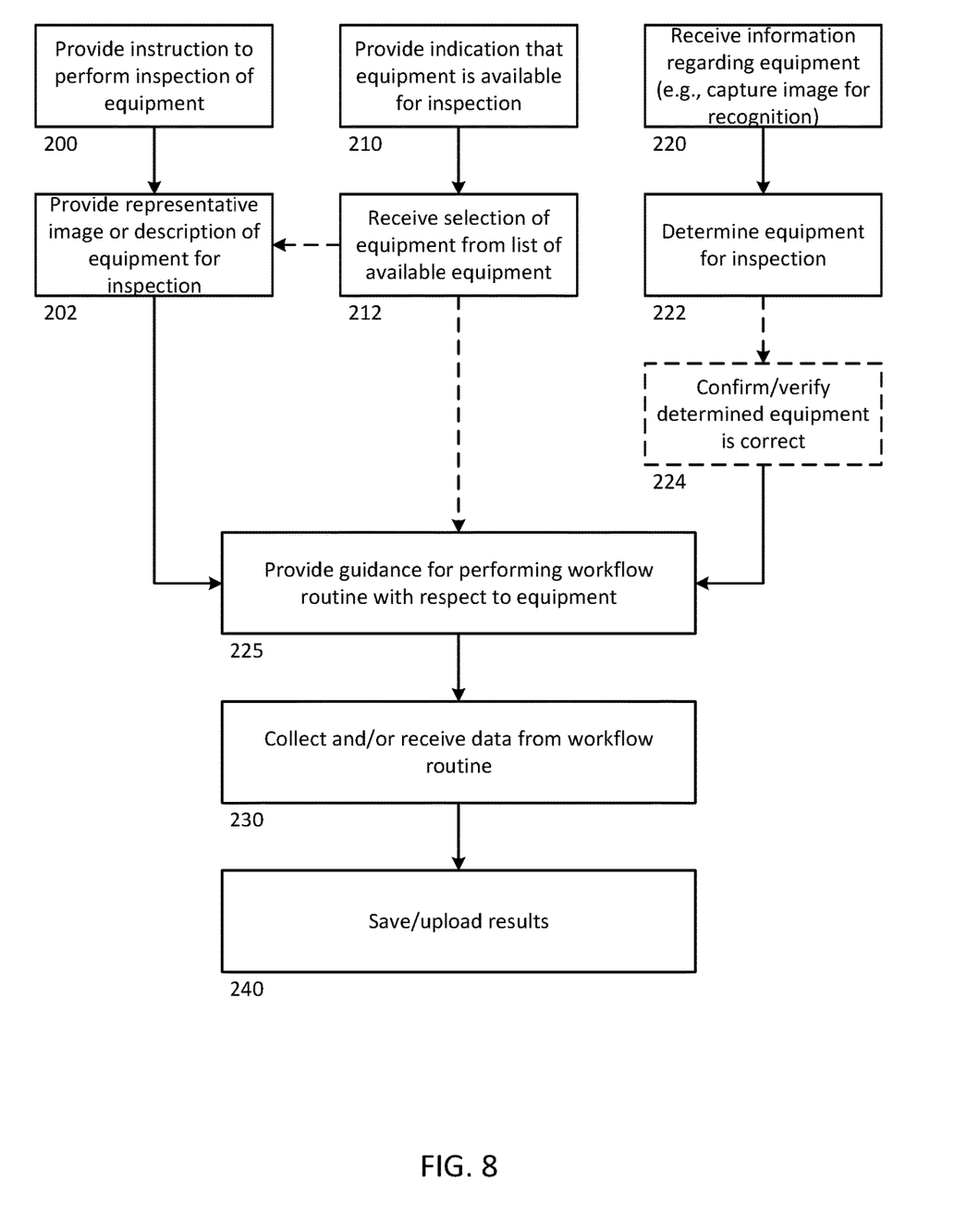
FIG. 8 is a process flow diagram illustrating a variety of possible processes for guiding a user through a workflow routine, collecting data during the workflow routine, and saving and/or uploading the results.

FIG. 8 is a process flow diagram illustrating a variety of possible processes for guiding a user through a workflow routine (225), collecting data during the workflow routine (e.g., an inspection process) (230) and saving and/or uploading the results (240). The processes in FIG. 8 may be performed by a maintenance/inspection system, for example, via one or more tools carried by a user providing guidance/instruction to the user.

In one example, a system may provide instruction to a user to perform inspection of a piece of equipment (200), and may provide a representative image or description of the equipment (202) to assist the user in finding the equipment.

In another exemplary process, the system may provide an indication to a user that equipment is available for inspection (210), for example, by way of a list of one or more available pieces of equipment. The system may receive a selection of equipment, for example, from such a list (212). In some examples, upon receiving the selection, the system may provide a representative image or description of the equipment (202) to assist the user in finding the equipment.

In still another exemplary process, the system may receive information regarding equipment for inspection from the user (220). Such information may include an acquired image or other identification information that the system may use to lookup the equipment, for example, via a lookup table, image recognition, or the like in order to determine the equipment that is to be inspected based on the received information (222). In some examples, the system may confirm that the determined equipment (e.g., from step 222) is correct (224), for example, by indicating to the user the equipment the system identified based on the received information.

Once the equipment is selected and/or confirmed, the system may provide guidance for performing a workflow routine with respect to the equipment, such as an inspection process (225). The system may collect (e.g., automatically) and/or receive (e.g., via a user interface) data from the workflow routine, such as image data, measurement data, or the like (230) and save the results internally and/or upload the results to a separate location, such as a remote server (240).

In various examples, such system processes can be performed by one or more processors distributed among one or more system components, such as tools carried by the user (e.g., imaging tools, test and measurement tools, external devices, etc.), remote servers, and the like. Components described as processors may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination.

Various embodiments have been described. Such examples are non-limiting, and do not define or limit the scope of the invention in any way. Rather, these and other examples are within the scope of the following claims.

The invention claimed is:

1. A system, comprising:
a user interface;
a processor communicatively coupled to the user interface;
a location device to detect a location of the system and output location data;
a non-transitory computer readable medium configured to store executable instructions, wherein the executable instructions, when executed by the processor, cause the system to:
receive an inspection workflow for a plurality of pieces of equipment;
detect, based on first location data indicating locations of the plurality of pieces of equipment, and second location data indicating the location of the system by the location device, that pieces of equipment among the plurality of pieces of equipment are within a predetermined proximity of the system;
present, in the user interface, a list of the pieces of equipment that are within the predetermined proximity of the system;
determine that maintenance for a given piece of equipment in the list has been performed and update the user interface to indicate which of the pieces of equipment in the list has been analyzed according to the inspection workflow and which of the pieces of equipment in the list has yet to be analyzed; and
in response to user selection of a piece of equipment identified in the user interface, present, via the user interface, an indication of guidance for inspection of the piece of equipment.

2. The system of claim 1, wherein the executable instructions, when executed by the processor, further cause the system to:
retrieve first location data of the piece of equipment; and
provide a direction to the piece of equipment based on the first location data and second location data detected by the location device.

3. The system of claim 1, wherein the executable instructions, when executed by the processor, further cause the system to:
collect measurement data from the piece of equipment; and
associate the measurement data with the piece of equipment.

4. The system of claim 1, wherein the executable instructions, when executed by the processor, further cause the system to:
collect image data in real time, wherein the image data is acoustic image data, infrared image data, or visible light image data.

5. The system of claim 1, further comprising an imaging tool, wherein the executable instructions, when executed by the processor, further cause the system to:
retrieve a first reference image of the piece of equipment;
display, in the user interface, the first reference image as a template image;
present, in the user interface, a live image to assist in positioning the imaging tool to capture an image of the piece of equipment corresponding to the template image;
capture the image of the piece of equipment as a second reference image; and
associate the second reference image with the piece of equipment.

6. The system of claim 5, wherein the viewing perspective comprises an orientation, a position, or a measuring distance.

7. A method, comprising:
receiving an inspection workflow for a plurality of pieces of equipment;
detecting that pieces of equipment among the plurality of pieces of equipment are within a predetermined proximity of a user, wherein the detecting is based on first location data indicating locations of the plurality of pieces of equipment, and second location data indicating a location of the user;
present, in a user interface, a list of the pieces of equipment that are within the predetermined proximity of the user;
indicate, in the user interface, which of the pieces of equipment in the list has been analyzed according to the inspection workflow and which of the pieces of equipment in the list has yet to be analyzed; and
in response to user selection of a piece of equipment identified in the user interface, present, via the user interface, an indication of guidance for inspection of the piece of equipment.

8. The method of claim 7, further comprising:
collecting measurement data from the piece of equipment; and
associating the measurement data with the piece of equipment.

9. The method of claim 7, further comprising:
retrieving a first reference image of the piece of equipment;
displaying the first reference image as a template image;
presenting a live image to assist in positioning an imaging tool to capture an image of the piece of equipment corresponding to the template image;
capturing the image of the piece of equipment as a second reference image; and
associating the second reference image with the piece of equipment.

10. The method of claim 9, further comprising:
updating the user interface to provide updated information indicating which of the pieces of equipment has been maintained according to the inspection workflow and which equipment has yet to be maintained.

11. A non-transient computer-readable medium containing executable instructions, wherein the executable instructions, when executed by a processor of a system, cause the system to:
receive an inspection workflow for a plurality of pieces of equipment;
detect that pieces of equipment among the plurality of pieces of equipment are within a predetermined proximity of a user, wherein the pieces of equipment are detected within the predetermined proximity of the user based on first location data indicating locations of the plurality of pieces of equipment, and second location data indicating a location of the user;

present, in a user interface, a list of the pieces of equipment that are within the predetermined proximity of the user;

indicate, in the user interface, which of the pieces of equipment in the list has been analyzed according to the inspection workflow and which of the pieces of equipment in the list has yet to be analyzed; and in response to user section of a piece of equipment identified in the user interface, present, via the user interface, guidance related to the inspection workflow for inspection of the piece of equipment.

12. The computer-readable medium of claim 11, wherein the executable instructions, when executed by the processor, further cause the system to:

collect measurement data from the piece of equipment; and associate the measurement data with the piece of equipment.

13. The computer-readable medium of claim 11, wherein the executable instructions, when executed by the processor, further cause the system to:

in response to detecting only one piece of equipment within the predetermined proximity of the user, automatically select the only one piece of equipment for inspection; and present, via the user interface, the guidance for the only one piece of equipment.

* * * * *